M. JACOBSON.
CAR FENDER.
APPLICATION FILED AUG. 6, 1912.
1,059,734.
Patented Apr. 22, 1913.
2 SHEETS—SHEET 2.
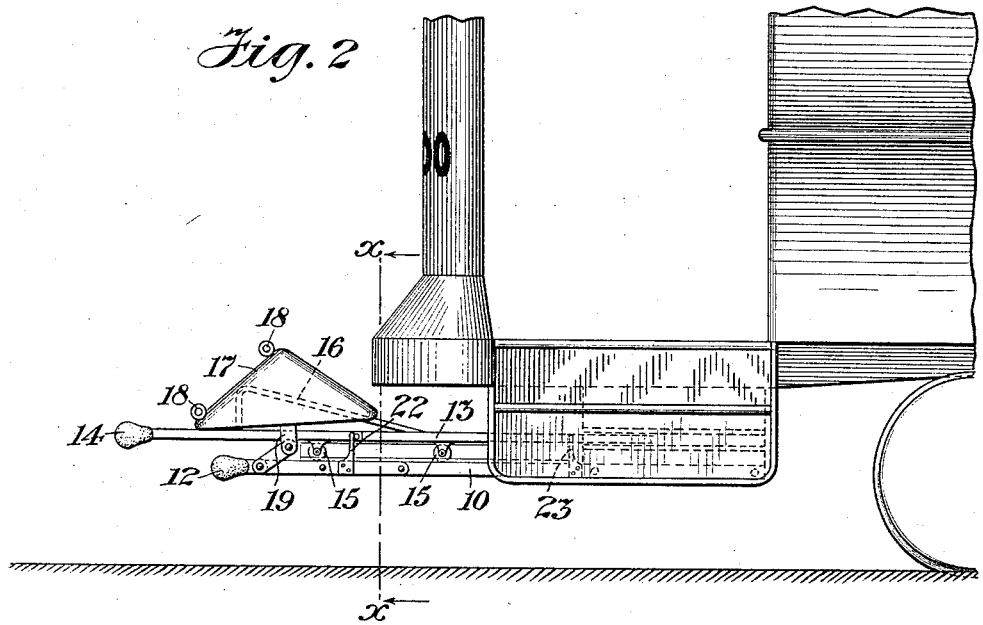
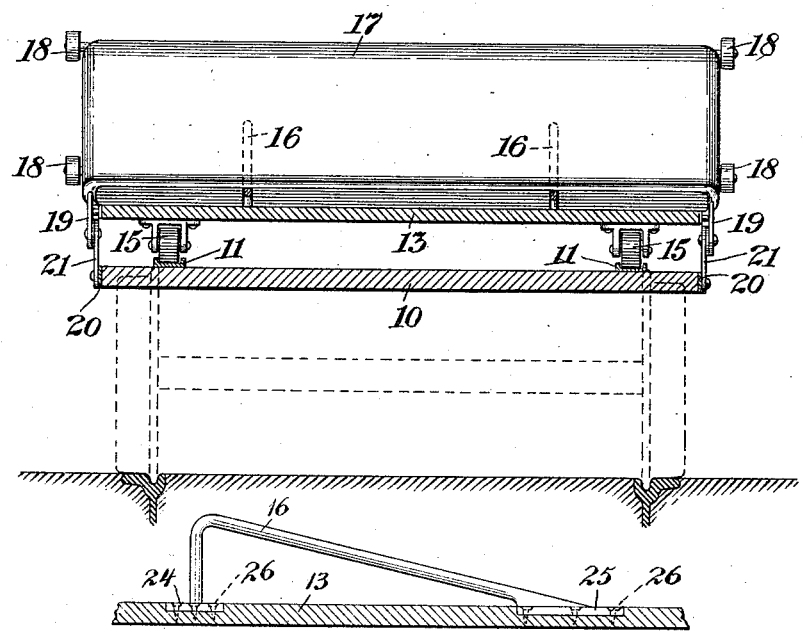
WITNESSES
Chas. F. Clagett
Geo. T. Pinckney
INVENTOR
Michael Jacobson
BY
Ferrell & Son
his ATTORNEYS

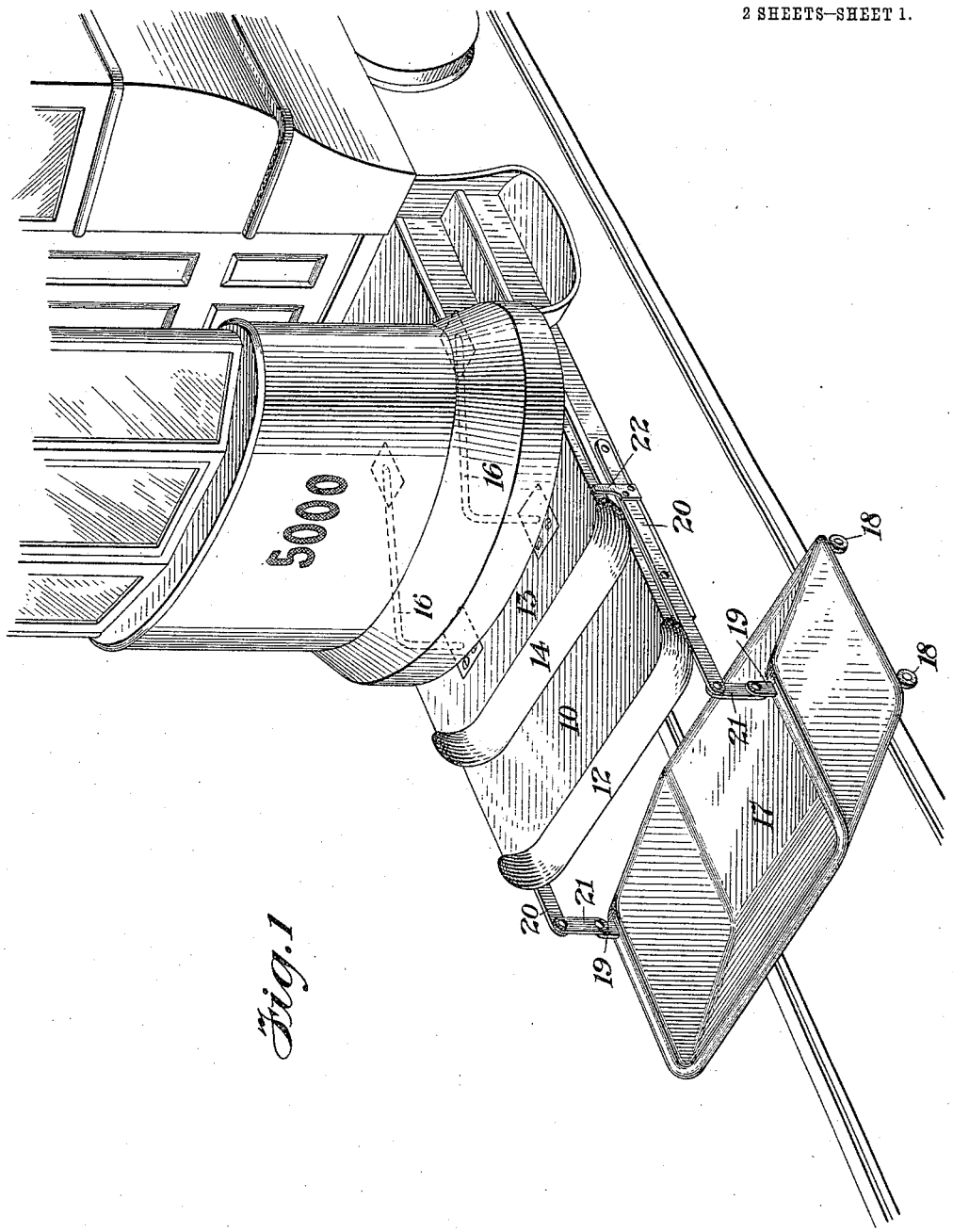

UNITED STATES PATENT OFFICE.

MICHAEL JACOBSON, OF NEW YORK, N. Y.

CAR-FENDER.

1,059,734.           Specification of Letters Patent.         Patented Apr. 22, 1913.

Application filed August 6, 1912. Serial No. 713,580.

*To all whom it may concern:*

Be it known that I, MICHAEL JACOBSON, a subject of the Czar of Russia, residing in the borough of Manhattan, city, county, and State of New York, have invented an Improvement in Car-Fenders, of which the following is a specification.

My present invention relates to a car fender, particularly adapted for use on motor vehicles but which may be employed with any vehicle, and my invention relates to that class of car fenders which, under normal conditions, are placed in inoperative positions and which, when the car strikes an obstruction of any kind whatsoever, are automatically moved into an operative position.

In carrying out my invention, I preferably provide a base member which is connected to a car in any desired manner, a platform which is movable on the base member, a hood or basket which is normally in position above the movable platform, and means associated with the platform and movable therewith upon the platform striking an obstruction, to then cause the movable basket to swing from its normal inoperative position above the movable platform to its abnormal or operative position below the base member, as will be hereinafter more particularly described.

In the drawing, Figure 1 is a perspective view of my improved car fender as applied to a street car. Fig. 2 is a side elevation of the same showing the parts in their normal positions. Fig. 3 is a transverse section taken approximately on line *x x*, Fig. 2, and Fig. 4 is a partial longitudinal cross section through the movable platform showing the manner in which the actuating rods are secured thereto.

Referring to the drawing, it will be seen that my improved fender comprises a fixed base member 10, which may be made of wood, metal or any other suitable material which is adapted to be connected to the dashboard or front portion of a car in any desired manner. The base member 10 is provided with guideways or tracks 11 and the front portion of the base is preferably upholstered or padded, as indicated at 12. Above the base member 10, I employ a platform 13 which may be made of wood, metal or any other suitable material. This platform 13 is also preferably padded or upholstered at its forward edge and on its upper surface and is provided with rollers or wheels 15 suitably mounted beneath the same, which run in guide-ways or tracks 11, and upon which the platform 13 is movable longitudinally of the base member 10. On the upper surface the platform 13 is provided with inclined rods 16 which may be constructed of metal strips or any other suitable material, and these rods 16 may be secured in the platform 13 in any desired manner which, however, forms no part of applicant's invention.

By reference to Fig. 4, it will be seen that, at the end of the vertical members of the rod 16, each one may be provided with a plate 24, and that at the ends of the inclined members of these rods 16 each of the same may be provided with a plate 25. The plates 24 and 25 are illustrated as being integral with the rods, but as will be understood, may be so made or may be connected thereto in any other desired manner. The plates 24 and 25 are set or sunk in recesses provided therefor in the upper face of the platform 13, and the rods secured in position by the plates 24 and 25 are connected to the platform 13 by means of the screws 26 or otherwise. I also employ a basket or hood 17, consisting of a suitable frame and any desired covering. The frame of the basket is provided with wheels 18, which, when the basket is in its operative position, as shown in Fig. 1, travel on the road-way and support the basket. The frame of the basket is also provided with lugs 19, and rigidly connected to the base member 10 and preferably at its edges are strap members 20. The lugs 19 are pivotally connected to the forward or free ends of the straps 20 by means of the links 21, through and upon which, as will be understood, the basket swings from its normal inoperative position, as shown in Fig. 2, to its abnormal or operative position, as shown in Fig. 1. The movable platform and base member are provided with suitable stops 22 and 23, the former limiting the forward movement or position of the movable platform, and the latter the rearward position thereof.

Now, as will be understood from the foregoing description, the parts of my improved car fender are normally in the positions shown in Fig. 2, and as will be apparent, the portion of the fender coming into contact with the obstruction, be it what it may, is the upholstered front edge indicated at 14. The impact of the contact between the movable platform and the obstruction is sufficient, be it ever so slight, to move the platform from its forward to its rearward position. This movement of the platform causes the basket 17 to ride upwardly on the inclined rods 16 and in so doing the basket acquires sufficient momentum turning on its pivotal points to be swung from its inoperative to its operative position, so that the object which has been struck by the car will either rest upon the forward portion of the base member or within the basket.

I claim as my invention:

1. A car fender comprising a base member, a platform movable thereon, a basket or hood, and means associated with the platform for swinging the said basket or hood from its normal inoperative position above the platform to its abnormal operative position below the base member.

2. A car fender comprising a base member, a platform movable on the base member, a basket pivotally connected to the said base member and adapted to be maintained normally in position above the platform, and means associated with the platform and actuated by the movement thereof for swinging the said basket from its said position above the platform to a position below the base member.

3. A car fender comprising a base member, a platform movable on the base member, a basket pivotally connected to the said base member and adapted to be maintained normally in position above the platform, means for limiting both the forward and rearward movement of the platform, and means associated with the platform and actuated by the movement thereof for swinging the said backet from its said position above the platform to a position below the base member.

4. A car fender comprising a base member, a platform movable on the base member, a basket pivotally connected to the said base member and adapted to be maintained normally in position above the platform, stops associated with the platform and base member for limiting both the forward and rearward movement of the platform, and means associated with the platform and actuated by the movement thereof for swinging the said basket from its said position above the platform to a position below the base member.

5. A car fender comprising a base member, a platform movable on the base member, a basket pivotally connected to the said base member and adapted to be maintained normally in position above the platform, stops associated with the platform and base member for limiting both the forward and rearward movement of the platform, and inclined rods connected to the upper surface of the said platform and upon which the said basket normally rests, these inclined rods through the movement of the platform being adapted to swing the basket from its normal position thereon to its operative position below the base member.

Signed by me this 29th day of July, 1912.

MICHAEL JACOBSON.

Witnesses:
GEO. T. PINCKNEY,
BERTHA M. ALLEN.

---

Copies of this patent may be obtained for five cents each, by addressing the "Commissioner of Patents Washington, D. C."